(12) United States Patent
Sharifi et al.

(10) Patent No.: US 12,183,348 B2
(45) Date of Patent: *Dec. 31, 2024

(54) GENERATING AND/OR UTILIZING VOICE AUTHENTICATION BIASING PARAMETERS FOR ASSISTANT DEVICES

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,735

(22) Filed: Oct. 23, 2023

(65) Prior Publication Data

US 2024/0046935 A1   Feb. 8, 2024

Related U.S. Application Data

(63) Continuation of application No. 16/952,830, filed on Nov. 19, 2020, now Pat. No. 11,823,684.

(51) Int. Cl.
*G10L 17/06* (2013.01)
*G10L 17/22* (2013.01)

(52) U.S. Cl.
CPC .............. *G10L 17/06* (2013.01); *G10L 17/22* (2013.01)

(58) Field of Classification Search
CPC ................................ G10L 17/06; G10L 17/22
USPC ......................................................... 704/246
See application file for complete search history.

(56) References Cited

U.S. PATENT DOCUMENTS

| | | | | |
|---|---|---|---|---|
| 5,339,385 | A * | 8/1994 | Higgins | G07C 9/37 704/E17.008 |
| 11,525,925 | B2 * | 12/2022 | Broumandan | G01S 19/29 |
| 2016/0248768 | A1 * | 8/2016 | McLaren | G10L 17/22 |
| 2019/0206411 | A1 * | 7/2019 | Li | H04L 12/282 |
| 2019/0206412 | A1 * | 7/2019 | Li | G10L 15/22 |
| 2019/0259387 | A1 * | 8/2019 | Mertens | G06Q 10/103 |
| 2020/0135184 | A1 * | 4/2020 | Chao | G10L 15/30 |
| 2020/0135187 | A1 * | 4/2020 | Chao | G10L 15/30 |
| 2020/0152206 | A1 * | 5/2020 | Shen | G10L 25/24 |
| 2020/0201443 | A1 * | 6/2020 | Huang | G06N 20/20 |
| 2021/0350346 | A1 * | 11/2021 | Edwards | G06Q 20/1085 |
| 2022/0068281 | A1 * | 3/2022 | Sharifi | G10L 17/04 |
| 2022/0100397 | A1 * | 3/2022 | Meier | G06F 3/0637 |
| 2022/0157321 | A1 * | 5/2022 | Sharifi | G10L 17/22 |

* cited by examiner

*Primary Examiner* — Edwin S Leland, III
(74) *Attorney, Agent, or Firm* — Gray Ice Higdon

(57) ABSTRACT

Implementations are directed to biasing speaker authentication on a per-user basis and on a device-by-device basis and/or contextual feature(s) basis. In some of those implementations, in performing speaker authentication based on a spoken utterance, different biasing parameters are determined for each of multiple different registered users of an assistant device at which the spoken utterance was detected. In those implementations, each of the biasing parameters can be used to make it more likely or less likely (in dependence of the biasing parameter) that a corresponding registered user will be verified using the speaker authentication. Through utilization of biasing parameter(s) in performing speaker authentication, accuracy and/or robustness of speaker authentication can be increased.

17 Claims, 3 Drawing Sheets

GENERATING AND/OR UTILIZING VOICE AUTHENTICATION BIASING PARAMETERS FOR ASSISTANT DEVICES

BACKGROUND

Humans can engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands/requests to an automated assistant using spoken natural language input (i.e., spoken utterances), which may in some cases be converted into text and then processed, and/or by providing textual (e.g., typed) natural language input. An automated assistant generally responds to a command or request by providing responsive user interface output (e.g., audible and/or visual user interface output), controlling smart device(s), and/or performing other action(s).

Some user commands or requests will only be fully processed and responded to when the automated assistant authenticates the requesting user. For example, to maintain security of personal data, user authentication can be required for requests that access personal data of the user in generating a response and/or that would incorporate personal data of the user in the response. For instance, user authentication can be required to appropriately respond to requests such as "what's on my calendar for tomorrow" (which requires accessing the requesting user's personal calendar data and including personal calendar data in a response) and "message Vivian I'm running late" (which requires accessing the requesting user's personal contact data). As another example, to maintain security of smart devices (e.g., smart thermostats, smart lights, smart locks), user authentication can be required for requests that cause control of one or more of such smart devices.

Various techniques for user authentication for automated assistants have been utilized. For example, in authenticating a user, some automated assistants utilize text-dependent speaker authentication (TD-SA) that is constrained to invocation phrase(s) for the assistant (e.g., "OK Assistant" and/or "Hey Assistant"). With such TD-SA, an enrollment procedure is performed in which the user is explicitly prompted to provide one or more instances of a spoken utterance of the invocation phrase(s) to which the TD-SA is constrained. Speaker features (e.g., a speaker embedding) for a user can then be generated through processing of the instances of audio data, where each of the instances captures a respective one of the spoken utterances. For example, the speaker features can be generated by processing each of the instances of audio data using a TD-SA machine learning model to generate a corresponding speaker embedding for each of the utterances. The speaker features can then be generated as a function of the speaker embeddings, and stored (e.g., on device) for use in TD-SA. For example, the speaker features can be a cumulative speaker embedding that is a function of (e.g., an average of) the speaker embeddings.

After the speaker features are generated, the speaker features can be used in verifying that a spoken utterance was spoken by the user. For example, when another spoken utterance is spoken by the user, audio data that captures the spoken utterance can be processed to generate utterance features, those utterance features compared to the speaker features, and, based on the comparison, a determination made as to whether to authenticate the speaker. As one particular example, the audio data can be processed, using the speaker recognition model, to generate an utterance embedding, and that utterance embedding compared with the previously generated speaker embedding for the user in determining whether to verify the user as the speaker of the spoken utterance. For instance, if a distance metric between the generated utterance embedding and the speaker embedding for the user satisfies a threshold, the user can be verified as the user that spoke the spoken utterance. Such authentication can be utilized as a criterion (e.g., the sole criterion) for authenticating the user.

As another example, in authenticating a user, some automated assistants additionally or alternatively utilize text-independent speaker authentication (TI-SA) that is not constrained to a limited set of phrase(s) but, rather, can be utilized with any phrases. TI-SA techniques can be similar to those described above with respect to TD-SA, although TI-SA is constrained to a limited set of phrase(s). Moreover, TI-SA can be less accurate than TD-SA and/or require a greater quantity of enrollment phrases than TD-SA.

However, existing techniques for TI-SA and/or TD-SA present various drawbacks. For example, it is often the case that the comparison between the utterance features and the speaker features is insufficient to verify the user with sufficient confidence. For instance, when the comparison includes generating a distance metric between utterance features that are an utterance embedding and speaker features that are a speaker embedding, the distance metric may not satisfy a closeness threshold for verifying the user. As a result, the automated assistant may have to prompt the user to again speak (e.g., an invocation phrase) to again attempt to verify and/or may have to prompt the user for further alternate authentication data (e.g., prompt for the user to provide a PIN or other passcode, prompt for the user to interact with a fingerprint sensor, and/or prompt for the user to position in front of a camera for facial authentication). This results in the human-assistant interaction being prolonged and resultant prolonged utilization of client device resources and/or other resources for facilitating the human-assistant interaction.

These drawbacks can be exacerbated in situations where two or more users are registered for an assistant device, the two or more users each utilize TI-SA and/or TD-SA, and the two or more users each have similar voice characteristics. For example, for an assistant device that is in a home environment, two family members may both utilize the device and have corresponding speaker features that are utilized by the assistant device in performing TI-SA and/or TD-SA to authenticate spoken utterances as being provided by a corresponding one of those two family members (or other registered family member(s)). Due to the two family members having similar voice characteristics, the corresponding speaker features for the two family members can be relatively similar to one another. This can result in various spoken utterances not being verifiable to either of the two family members. For example, when distance metrics are determined, a first distance metric to first speaker features for a first of the family members and a second distance metric to second speaker features for a second of the family members can both be the same value or relatively close to the same value (e.g., within 5%, 10%, or other threshold distance of one another). Accordingly, there can be situations where a spoken utterance is not verifiable to either of the family members or even incorrectly verified as being provided by a first of the family members when actually provided by a second of the family members.

SUMMARY

Some implementations disclosed herein relate to biasing speaker authentication (TI-SA and/or TD-SA) on a per-user basis and on a device-by-device basis and/or contextual feature(s) basis. In some of those implementations, in performing speaker authentication based on a spoken utterance, different biasing parameters are determined for each of multiple different registered users of an assistant device at which the spoken utterance was detected. In those implementations, each of the biasing parameters can be used to make it more likely or less likely (in dependence of the biasing parameter) that a corresponding registered user will be verified using the speaker authentication. The assistant device at which a spoken utterance is detected can be the only assistant device at which the spoken utterance is detected, or the assistant device determined, using device arbitration technique(s), to be closest to the source of the spoken utterance. An assistant device is a client device that includes an automated assistant interface for interacting with an automated assistant. The automated assistant can be implemented on the client device and/or on remote server(s) in network communication with the client device.

As described herein, through utilization of biasing parameter(s) in performing speaker authentication, accuracy and/or robustness of speaker authentication can be increased. This can obviate the need for prompting for alternate authentication data (e.g., prompt for the user to provide a PIN or other passcode, prompt for the user to interact with a fingerprint sensor, and/or prompt for the user to position in front of a camera for facial identification). This prevents the human-assistant interaction from being prolonged, reduces a quantity of inputs required by the user during the human-assistant interaction, and lessens the amount of client device resources and/or other resources needed for facilitating the human-assistant interaction. Additionally or alternatively, this can prevent occurrence(s) of errant speaker verifications.

In various implementations, the biasing parameter for an assistant device and for a given registered user, of the different registered users, can be based on a quantity of past interactions at the assistant device in which the past interaction was verified to be from the given registered user. The past interactions considered in determining a quantity of past interactions at an assistant device can include all past interactions at the assistant device or only a subset of the past interactions. For example, the subset of past interactions can include those over a particular time period such as the most recent week, the most recent fifteen days, the most recent forty-five days, or other time period. As another example, the subset of past interactions can include those since the occurrence of one or more events, such as the assistant device being moved (e.g., as determined based on an update to the assistant device in a device topology or based on proximity consideration(s) described herein) or a new registered user being added for the assistant device. A past interaction can be verified to be from a given user based on, for example, a non-modified voice authentication measure for that past interaction (i.e., a voice authentication measure determined without application of biasing parameter(s)) satisfying a threshold that indicates a threshold strength of authentication and/or based on additional or alternative authentication techniques. Such additional or alternative authentication techniques can include, for example, fingerprint authentication, facial authentication, and/or pin code (or other authentication code) authentication. As one example of generating a biasing parameter for a given user for an assistant device, the biasing parameter can be based on comparing (a) the quantity of verified past interactions of the given user with the assistant device and (b) an additional quantity of other verified past interactions with the assistant device by other registered user(s).

In some implementations, the biasing parameters can be the same for an assistant device and for all contextual conditions. Contextual conditions can include temporal condition(s) (e.g., time of day, time period of a day, day of week, particular date(s)) and/or environmental condition(s) (e.g., state(s) of other assistant device(s), recent interaction(s) and/or authentication(s) at other assistant device(s), state(s) of IoT device(s) linked with the assistant device). In other implementations, different biasing parameters can apply for different contextual condition(s). For example, a first biasing parameter can be determined for a given user, for a given assistant device, and for first environmental condition(s)—and a distinct second biasing parameter determined for the given user, for the given assistant device, and for second environmental condition(s). For instance, the first environmental condition(s) can be "weekend days" and the second environmental condition(s) can be "weekdays" and the first biasing parameter determined based on a quantity of verified past interactions with the given assistant device and from the given user during "weekend days" and the second biasing parameter determined based on a quantity of verified past interactions with the given assistant device and from the given user during "weekdays".

Although some preceding example(s) describe determining the biasing parameter for a given user based on comparing (a) the quantity of verified past interactions of the given user with the assistant device and (b) an additional quantity of other verified past interactions with the assistant device by other registered user(s), additional and/or alternative techniques can be utilized. As one example, a machine learning model can be trained that can be utilized to process contextual condition(s) and/or other data (e.g., term(s) of a corresponding utterance and/or intent(s) determined from the utterance) and generate output that includes a corresponding biasing parameter for each of the multiple registered users for an assistant device. For instance, the machine learning model can be trained using training instances that are each based on a corresponding verified past interaction. Each training instance can include training instance input that includes values for contextual condition(s) present during the past interaction and/or other data from the past interaction. Further, each training instance can include training instance output that reflects which of the registered users was verified for the past interaction. For instance, the training instance output can be a one-hot vector whose "hot" value corresponds to which of the registered users was verified for the past interaction and whose other value(s) each correspond to another of the registered user(s) (or correspond to a null-slot if the output dimensions of the machine learning model exceed the quantity of registered users).

In some implementations, in utilizing a biasing parameter for a given user in performing speaker authentication, at least part of detected audio data, that captures a spoken utterance, is processed using a speaker authentication model, to generate utterance features that correspond to the at least part of the audio data. For example, the utterance features can be a d-vector or other embedding of the audio data. Further, an initial voice authentication measure for the given user can be generated based on comparing the utterance features to first speaker features stored in association with the given user. The first speaker features can be previously generated. For example, they can be previously generated during an enrollment procedure in which the given user provided sample utterances, and can be an average (or otherwise a function of) d-vectors (or other embedding) of instances of audio data corresponding to those utterances. Yet further, a modified voice authentication measure can be generated as a function of the initial voice authentication measure and the biasing parameter. For example, the modified voice authentication measure can be generated by multiplying the biasing parameter and the initial voice authentication measure, by boosting (or demoting) the initial voice authentication measure by the biasing parameter, and/or otherwise considering both the biasing parameter and the initial voice authentication measure. The modified voice authentication measure can then be used in determining whether to authenticate the given user. This can optionally be done for each of multiple registered users, using their respective biasing parameters and respective generated initial voice authentication measures, in determining which of the multiple users (if any) to verify.

In some implementations, in utilizing a biasing parameter for a given user in performing speaker authentication, a corresponding initial voice authentication measure is generated for each of multiple different registered users. For example, the initial voice authentication measures can each be generated based on comparing an utterance feature, generated based on a spoken utterance, to corresponding speaker features for a corresponding registered user. In some of those implementations, the biasing parameters can then be used as a tiebreaker if multiple registered users have a corresponding initial voice authentication measure that satisfies an absolute threshold and/or a threshold relative to other initial voice authentication measure(s) (e.g., multiple initial voice authentication measures are close to one another).

In some implementations, biasing measures that are specific to a particular assistant device can also be utilized as the biasing measures for an additional assistant device, or at least used to influence biasing parameters for the additional assistant device. For example, for a newly purchased and recently installed assistant device that may not yet have many (or any) past interactions, biasing measures for the assistant device can be determined based on biasing measures from one or more additional assistant devices based on determining those additional assistant device(s) satisfy proximity condition(s) relative to the assistant device. The biasing measures from the additional assistant device(s) can be transmitted to the assistant device using a Wi-Fi network shared amongst the devices, peer-to-peer communication, and/or other communication technique(s). The proximity condition(s) can include, for example, that the assistant devices are assigned, in a device topology, to a same structure (e.g., a particular home, a particular vacation home, a particular office) and/or to a same room (e.g., kitchen, living room, dining room) or other area(s) within the same structure. As another example, the proximity condition(s) can include that sensor signals, from each of the assistant devices, indicate that they are positionally proximal to one another. For instance, if the assistant devices each consistently (e.g., greater than 70% of the time or other threshold) detect occurrence of a wake word at or near (e.g., within a second of) the same time—this can indicate they are positionally proximate to one another. Also, for instance, one of the assistant devices can emit a signal (e.g., an ultrasonic sound) and the other of the assistant devices and can attempt to detect the emitted signal. If the other of the assistant devices and detects the emitted signal, optionally with a threshold strength, then it can indicate they are positionally proximate to one another.

Accordingly, various implementations disclosed herein can utilize biasing measures to increase accuracy of speaker verifications on a device-by-device basis and/or on a contextual basis. As one example, assume an ecosystem of assistant devices of a household include a first assistant device located in an office and a second assistant device located in a basement playroom. Further assume the first assistant device is used mostly (or even exclusively) by a first registered user and the second assistant device is used mostly (or even exclusively) by a second registered user. In such an example, implementations disclosed herein can be utilized to generate biasing parameter(s) for the first device that increase the likelihood of the first registered user being authenticated during interactions with the first device and optionally to generate other biasing parameter(s) that decrease the likelihood of other registered user(s) being authenticated with the first device. Further, implementations disclosed herein can be utilized to generate biasing parameter(s) for the second device that increase the likelihood of the second registered user being authenticated during interactions with the second device and optionally decrease the likelihood of other registered user(s) being authenticated with the second device.

As another example, assume an ecosystem of assistant devices and that on weekday mornings a first registered exclusively interacts with certain (or even all) of the assistant devices. In such an example, implementations disclosed herein can be utilized to generate biasing parameter(s) for certain (or even all) of the assistant devices that increases the likelihood of the first registered user being authenticated during interactions that occur on weekday mornings and optionally to generate other biasing parameter(s) that decrease the likelihood of other registered user(s) being authenticated on weekday mornings.

In various implementations, some or even all steps of methods described herein are performed locally by processor(s) of a corresponding assistant device. However, in other implementations some or all steps could be performed at remote assistant component(s) that are in network communication with the corresponding assistant device via which audio data is detected.

Although many examples disclosed herein are described with respect to voice authentication, various implementations can be adapted for utilization in other automated assistant techniques. As one non-limiting example, techniques can be adapted for use in determining in which language an utterance is provided, which can influence which speech recognition model is utilized in processing the utterance (e.g., a first language speech recognition model or a second language speech recognition model) and/or which recognition results, from different recognition models, are utilized. For instance, some approaches can analyze acoustic properties of a spoken utterance and/or outputs from different language speech recognition models in determining measure(s) that indicate in which language an utterance is provided. When such measures satisfy threshold(s), they can be used to adapt a biasing measure for the corresponding language and on a device-by-device basis and/or a contextual condition(s) basis. The biasing measures for the different languages can then be utilized in situations when such measure(s) don't satisfy thresholds—to generate modified measure(s) and/or to serve as a tiebreaker between two different languages.

The above is provided merely as an overview of some implementations. Those and/or other implementations are disclosed in more detail herein.

DETAILED DESCRIPTION

Any one of a plurality of users can interact with an automated assistant using any one of multiple shared assistant devices. For example, some households, workspaces, and/or other environments can possess a coordinated "ecosystem" of shared assistant devices that can receive user input directed to the automated assistant and/or can be controlled by the automated assistant. Such devices include one or more smart phones, one or more tablet computers, one or more vehicle computing systems, one or more wearable computing devices, one or more smart televisions, one or more interactive standalone speakers, one or more interactive standalone speakers with a display, one or more IoT devices, among other assistant devices.

A shared assistant device is a client device that includes an automated assistant interface for interacting with an automated assistant (implemented on the client device and/or on remote server(s) in network communication with the client device), and that is interacted with by multiple users. One or more (e.g., all) of the users that interact with the shared assistant device can be registered users for that shared assistant device and, optionally for each of the multiple assistant devices of an ecosystem. A registered user for an assistant device can, with permission from the registered user, have their speaker features stored (e.g., locally at the assistant device) for use (e.g., by the assistant device) in speaker verification techniques described herein. The speaker verification techniques can enable verification of which registered user (if any) provided a corresponding spoken utterance. When a registered user is verified as providing a spoken utterance, one or more aspects of further processing of that utterance can be adapted based on data that is specific to the registered user. For example, speech recognition and/or natural language understanding of recognized speech can be adapted based on data specific to the registered user, and/or a response and/or other action(s) responsive to the spoken utterance can be adapted based on data specific to the registered user. Accordingly, although the shared assistant device is "shared", interactions with the shared assistant device can still be at least selective adapted to the interacting user through utilization of speaker verification and/or other verification technique(s). Guest users that do not have a corresponding user account that is active can also optionally interact with the shared assistant device. However, speaker verification will not be performed for such guest users as they do not have stored speaker features. One example of a shared assistant device is an interactive speaker, optionally with a display, that is in a home setting and that over time is interacted with by multiple family members, each with corresponding user accounts, and by guests.

Figure 1:
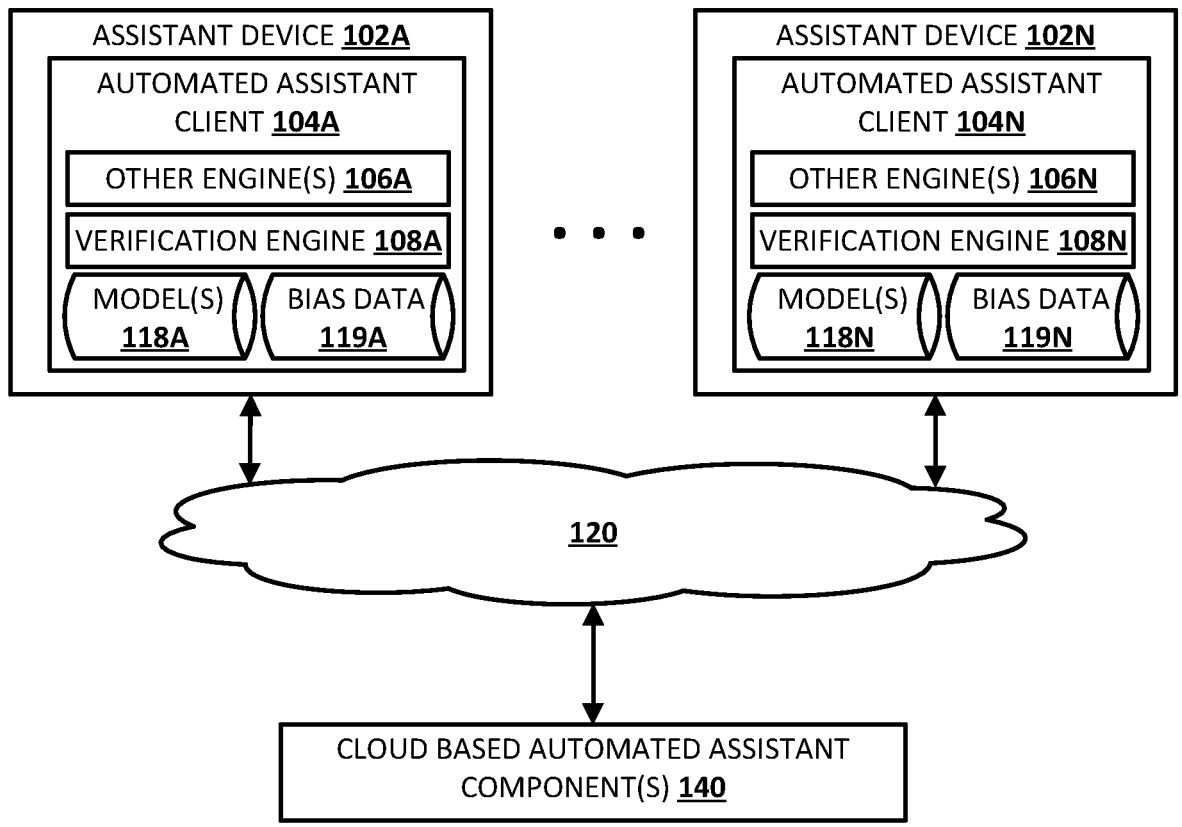
FIG. 1 is a block diagram of an example computing environment in which implementations disclosed herein may be implemented.

Turning initially to FIG. 1, an example environment is illustrated in which implementations disclosed herein can be implemented. The example environment includes an ecosystem of assistant devices, including a first assistant device 102A, a second assistant device 102N, and optionally additional assistant device(s) (as indicated by the ellipsis). The example environment further includes cloud based automated assistant component(s) 140. The cloud based automated assistant component(s) 140 can be implemented on one or more computing systems (collectively referred to as a "cloud" computing system) that are communicatively coupled to assistant device 102 via one or more local and/or wide area networks (e.g., the Internet) indicated generally at 108. Further, although not illustrated in FIG. 1, one or more local ateran network(s) can optionally be utilized for communication amongst the assistant devices 102A-N, such as those utilizing Wi-Fi, direct peer-to-peer network(s) such as those utilizing Bluetooth, and/or other communication topologies utilizing other communication protocol(s).

The assistant devices 102A-N can all be disposed within a household, a business, or other environment. Further, the assistant devices 102A-N can all be linked together, or otherwise associated with one another, in one or more data structures. For example, the assistant devices 102A-N can all be registered with the same set of user account(s), registered with a particular structure, and/or all assigned to a particular structure in a device topology representation. The device topology representation can include, for each of the assistant devices the assistant devices 102A-N, corresponding unique identifier(s) and can optionally include corresponding unique identifier(s) for other device(s) that are not assistant devices (but can be interacted with via an assistant device), such as IoT device(s) that do not include an assistant interface. As another example, the assistant devices 102A-N can all be linked together, or otherwise associated with one another, as a function of being connected to the same wireless network, such as a secure access wireless network and/or as a function of collectively being in peer-to-peer communication with one another (e.g., via Bluetooth and after pairing(s)). Put another way, in some implementations multiple assistant devices can be considered linked together as a function of being in secure network connection with one another and without necessarily being associated with one another in any data structure.

The assistant device 102A includes an instance of an automated assistant client 104A and the assistant device 102N also includes an instance of an automated assistant client 104N. An instance of an automated assistant client, optionally via interaction(s) with one or more of the cloud-based automated assistant component(s) 140, can form what appears to be, from the user's perspective, a logical instance of an automated assistant with which the user may engage in a human-to-computer dialog.

In various implementations, the assistant device 102A and/or the assistant device 102N may optionally operate one or more other applications that are in addition to automated assistant client 104A or 104N, such as a message exchange client (e.g., SMS, MMS, online chat), a browser, and so forth. In some of those various implementations, one or more of the other applications can optionally interface (e.g., via an application programming interface) with the automated assistant client 104A or 105N, or include their own instance of an automated assistant application (that may also interface with the cloud-based automated assistant component(s) 140).

Moreover, the automated assistant client 104A can include a verification engine 108A and other engine(s) 106A. Likewise, the automated assistant client 104N can also include a verification engine 108N and other engine(s) 106N. The other engine(s) 106A can include the same engine(s) as other engine(s) 106N or the engine(s) can differ amongst the two automated assistant clients 104A and 104N. For example, due to differing hardware capabilities between the assistant device 102A and 102N, other engine(s) 106A can include additional and/or more robust engine(s) than does other engine(s) 106N.

The verification engine 108A and the verification engine 108N can each determine which registered user to authenticate (if any) for a spoken utterance detected at a respective assistant device 102A or 102N. In doing so, the verification engine 108A and the verification engine 108N can at least selectively perform TD-SA and/or TI-SA that is adapted according to implementations disclosed herein. For example, the TD-SA and/or the TI-SA can at least selectively be adapted to take into account biasing parameter(s) of one or more of the registered users. As described herein, such biasing parameter(s) that are utilized can optionally be specific to the assistant device that detected the spoken utterance and/or to current contextual condition(s) at a time of detection of the spoken utterance. In various implementations, the verification engine 108A and the verification engine 108N can each perform one or more (e.g., all but blocks 252, 264, and 272) steps of the method 200 of FIG. 2 described herein. In some implementations, the verification engine 108A and/or the verification engine 108N, in determining whether to authenticate a registered user, additionally or alternatively utilize fingerprint verification, facial verification, and/or other verification technique(s).

The verification engine 108A can utilize locally stored model(s) 118A and/or locally stored bias data 119A in determining which registered user to authenticate (if any) for a spoken utterance. Likewise, the verification engine 108N can utilize locally stored model(s) 118N and/or locally stored bias data 119N in determining which registered user to authenticate (if any) for a spoken utterance.

The model(s) 118A and/or 118N can each include one or more verification models. The verification model(s) can include machine learning models, such as a neural network model trained for TD-SA and/or a neural network model trained for TI-SA. For example, the neural network model(s) can be encoding models trained to be utilized to process audio data (e.g., a Mel-Frequency Cepstral Coefficients representation thereof and/or other digital representation thereof) to enable generation of an encoded embedding (e.g., a d-vector) of the processed audio data. The embedding of the processed audio data will have a position, in embedding space, that reflects acoustic characteristics of the processed audio data. For instance, a TD-SA model can be trained based on utterances, from a plurality of disparate users, that are constrained to certain words/phrases. The TO-SA model can be trained so that embeddings generated using the TD-SA model are far apart in embedding space when they are generated based on acoustically dissimilar utterances, and closer together in embedding space when they are generated based on acoustical similar utterances.

The verification engine 108A or 108B can use corresponding model(s) 118A in generating an utterance embedding based on audio data that corresponds to at least part of a detected utterance. Further, the verification engine 108A or 108B can compare the utterance embedding to each of a plurality of locally stored speaker embeddings, each for a different registered user, to generate a corresponding voice authentication measure for a corresponding one of the registered users. For example, a first voice authentication measure can be generated for a first registered user based on comparing the utterance embedding to a stored first speaker embedding for the first registered user. For instance, the first voice authentication measure can be based on (e.g., equal to) a distance metric that reflects distance between the utterance embedding and the first speaker embedding, in embedding space. The first speaker embedding can be generated, for example, based on enrollment utterances provided by the first registered user.

The bias data 119A can directly or indirectly reflect biasing parameters for each of a plurality of registered users. For example, the bias data 119A can directly reflect biasing parameters for each of the plurality of registered users. A single corresponding biasing parameter can be included for each of the registered users or, alternatively, different biasing parameters can be included for each of the registered users, and each biasing parameter can be specific to certain contextual condition(s). As another example, the bias data 119A can include a machine learning model that can be used to process current contextual condition(s) and/or other current data, and to generate output that reflects biasing measures, for each of the registered users, that is contingent on the processed data. Such a machine learning model is an example of bias data that indirectly reflects biasing parameters. The bias data 119N can likewise directly or indirectly reflect biasing parameters for each of a plurality of registered users. In some implementations, the bias data 119A is based on past interactions with the assistant device 102A and the bias data 119N is based on past interactions with the assistant device 102N. In some other implementations, the bias data 119A and the bias data 119N can optionally be the same and/or influenced by one another. For example, the bias data 119A and the bias data 119N can be the same if it is determined that assistant device 102A and 102N satisfy proximity condition(s) relative to one another.

The verification engine 108A can generate the bias data 119A and maintain the bias data 119A up to date as described herein. For example, the verification engine 108A can generate the bias data 119A based on past interactions that were verified, without use of biasing parameter(s), to be by a corresponding registered user. Further, the verification engine 108A can at least selectively utilize the bias data 119A in performing speaker authentication. For example, the verification engine 108A can utilize the bias data 119A in performing speaker authentication when initially generated voice authentication measure(s) (e.g., generated using model(s) 118A) are insufficient for verification (e.g., fail to satisfy threshold(s)). For instance, the verification engine 108A can utilize the bias data 119A to generate modified voice authentication measure(s) that are each a modification of an initially generated voice authentication measure and/or as a tiebreaker between two or more initially generated voice authentication measure(s).

The verification engine 108N can likewise generate the bias data 119N and maintain the bias data 119N up to date as described herein. Further, the verification engine 108N can likewise at least selectively utilize the bias data 119N in performing speaker authentication.

The other engine(s) 106A and/or 106N can include one or more local engine(s) such as an invocation engine, an automatic speech recognition (ASR) engine, a natural language understanding (NLU) engine, a fulfillment engine, and/or a text-to-speech (TTS) engine.

An invocation engine is operable to detect the presence of one or more spoken invocation wakewords and/or to detect the presence of other invocation cue(s) (e.g., actuation of software or hardware invocation buttons, touch-free gesture-based invocations, etc). The invocation engine can invoke the automated assistant in response to detection of one of the invocation cues. For example, the invocation engine can invoke the automated assistant in response to detecting a spoken invocation wakeword such as "Hey Assistant," "OK Assistant", and/or "Assistant". The invocation engine can continuously process (e.g., if not in an "inactive" mode) a stream of audio data frames that are based on output from one or more microphones of the corresponding assistant device, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant. As used herein, "invoking" the automated assistant can include causing one or more previously inactive functions of the automated assistant to be activated. For example, invoking the automated assistant can include causing one or more local engines and/or cloud-based automated assistant components to further process audio data frames based on which the invocation phrase was detected, and/or one or more following audio data frames (whereas prior to invoking no further processing of audio data frames was occurring). For instance, local and/or cloud-based components can process captured audio data using an ASR model in response to invocation of the automated assistant. In various implementations, the verification engine(s) 108A and/or 108N can perform TD-SA, and the term(s) to which the TD-SA is dependent can include (or be restricted to) invocation wakeword(s). In some of those implementations, an invocation engine can, responsive to detecting a wakeword, cause the verification engine 108A or 108N to process corresponding audio data in performing TD-SA.

An ASR engine can process audio data that captures a spoken utterance to generate a recognition of the spoken utterance. For example, the ASR engine can process the audio data utilizing one or more ASR machine learning models to generate a prediction of recognized text that corresponds to the utterance. In some implementations, when a verification engine (e.g., 108A or 108N) verifies a spoken utterance as being provided by a given user, an indication of the given user can be provided to and utilized by the ASR engine to bias recognition toward term(s) that are relevant to the registered user (e.g., term(s) often spoken by the registered user, term(s) from contact(s) and/or media of the registered user, etc.).

An NLU engine determines semantic meaning(s) of audio and/or text converted from audio by the ASR engine, and determines assistant action(s) that correspond to those semantic meaning(s). In some implementations, the NLU engine determines assistant action(s) as intent(s) and/or parameter(s) that are determined based on recognition(s) of the ASR engine. In some situations, the NLU engine can resolve the intent(s) and/or parameter(s) based on a single utterance of a user and, in other situations, prompts can be generated based on unresolved intent(s) and/or parameter(s), those prompts rendered to the user, and user response(s) to those prompt(s) utilized by the NLU engine in resolving intent(s) and/or parameter(s). In those situations, the NLU engine can optionally work in concert with a dialog manager engine that determines unresolved intent(s) and/or parameter(s) and/or generates corresponding prompt(s). The NLU engine can utilize one or more NLU machine learning models in determining intent(s) and/or parameter(s). In some implementations, when a verification engine (e.g., 108A or 108N) verifies a spoken utterance as being provided by a given user, an indication of the given user can be provided to and utilized by the NLU engine in interpreting text and/or in biasing toward intent(s) and/or parameter(s) that are relevant to the registered user. As one example, a first registered user can have previously created an explicit mapping between an utterance of "good morning" and a first set of actions and a second registered user can have previously created a distinct explicit mapping between an utterance of "good morning" and a second set of actions that are different from the first set of actions. In such an example, whether the NLU engine determines the first set of actions or the second set of actions, in response to text of "good morning", can be contingent on whether the verification engine provided an indication that a spoken utterance, corresponding to the text, was provided by the first registered user or was instead provided by the second registered user.

A fulfillment engine can cause performance of assistant action(s) that are determined by the NLU engine. For example, if the NLU engine determines an assistant action of "turning on the kitchen lights", the fulfillment engine can cause transmission of corresponding data (directly to the lights or to a remote server associated with a manufacturer of the lights) to cause the "kitchen lights" to be "turned on". As another example, if the NLU engine determines an assistant action of "provide a summary of the user's meetings for today", the fulfillment engine can access the user's calendar, summarize the user's meetings for the day, and cause the summary to be visually and/or audibly rendered at the assistant device. In some implementations, when a verification engine (e.g., 108A or 108N) verifies a spoken utterance as being provided by a given user, an indication of the given user can be provided to and utilized by the fulfillment engine in causing performance of the assistant action(s). For example, when the assistant action(s) are restricted to performance by only a subset (e.g., only a single) of registered users, the fulfillment engine can require verification that a corresponding spoken utterance was provided by a member of that subset, before causing performance of the corresponding assistant action(s).

A TTS engine can convert text to synthesized speech, and can rely on one or more speech synthesis neural network models in doing so. The TTS engine can be utilized, for example, to convert a textual response into audio data that includes a synthesized version of the text, and the synthesized version audibly rendered via hardware speaker(s) of the assistant device. In some implementations, when a verification engine (e.g., 108A or 108N) verifies a spoken utterance as being provided by a given user, an indication of the given user can be provided to and utilized by the TTS engine. For example, a first registered user can have a setting that synthesized speech be provided in a first voice (e.g., a male voice) and a second registered user can have a setting that synthesized speech be provided in a second voice (e.g., a female voice). In such an example, the indication of the given user can be utilized to select the appropriate TTS engine, TTS model, and/or synthesis parameter(s), for generating synthesized speech in the corresponding voice.

Cloud-based automated assistant component(s) 140 are optional and can operate in concert with corresponding component(s) of the automated assistant client 104A and/or 104N, and/or can be utilized (always or selectively) in lieu of corresponding component(s) of the automated assistant client 104A and/or 104N. In some implementations, cloud-based component(s) 140 can leverage the virtually limitless resources of the cloud to perform more robust and/or more accurate processing of audio data, and/or other data, relative to any counterparts of the automated assistant client 104A and/or 104N. In various implementations, the assistant device 102A or 102N can provide audio data and/or other data to the cloud-based automated assistant component(s) 140 in response to an invocation engine detecting a spoken invocation phrase, or detecting some other explicit invocation of the automated assistant.

Figure 2:
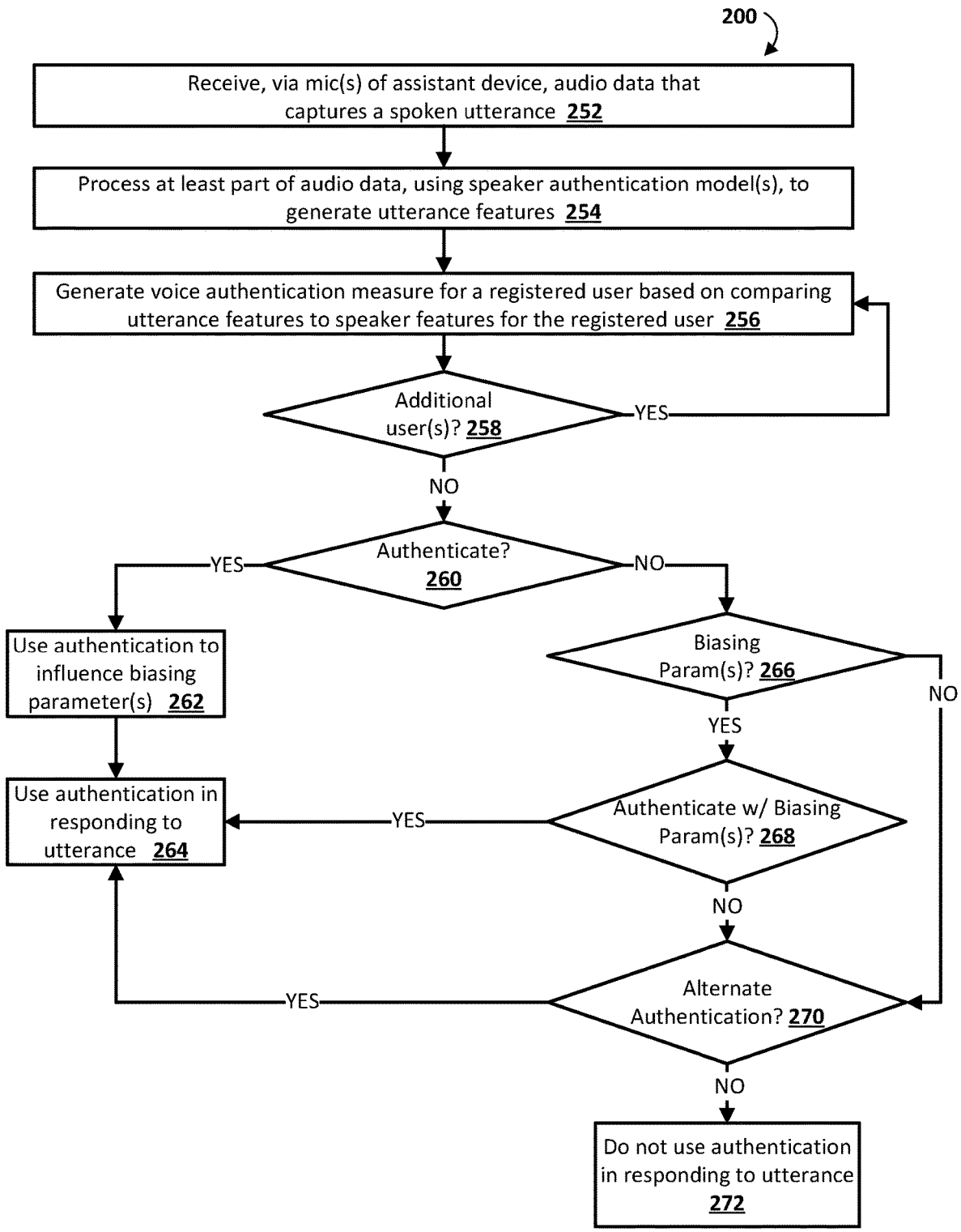
FIG. 2 is a flowchart illustrating an example method according to implementations disclosed herein.

FIG. 2 is a flowchart illustrating an example method 200 in accordance with various implementations. For convenience, the operations of the flow chart are described with reference to a system that performs the operations. This system may include various components of various computer systems, such as one or more components of assistant device 110A or assistant device 110B. Moreover, while operations of method 200 are shown in a particular order, this is not meant to be limiting. One or more operations may be reordered, omitted or added.

At block 252, the system detects, via microphones(s) of an assistant device, audio data that captures a spoken utterance of a user.

At block 254, the system processes at least part of the audio data, using speaker authentication model(s), to generate utterance features. For example, the system can generate text-dependent utterance features, using a TD-SA speaker authentication model, by processing a portion of the audio data that corresponds to the text on which the TD-SA speaker authentication model is dependent. As another example, the system can additionally or alternatively generate text-independent utterance features, using a TI-SA speaker authentication model, by processing all of the audio data that corresponds to the utterance.

At block 256, the system generates a voice authentication measure for a registered user based on comparing the utterance features of block 254 to speaker features for the registered user. The speaker feature can be, for example, previously generated based on enrollment utterances provided by the registered user, and stored locally at a corresponding assistant device.

At block 258, the system determines if there are additional registered user(s) for which a voice authentication measure has yet to be generated for the spoken utterance. If so, the system proceeds back to block 256 and generates a voice authentication measure for one of those additional registered users. If not, the system proceeds to block 260.

At block 260, the system determines whether any one of the registered users can be authenticated based on their corresponding voice authentication measure and/or based on other optional non-voice based authentication measure(s) (e.g. facial authentication). For example, the system can determine to authenticate one of the registered users only if the voice authentication measure satisfies threshold(s), such as an absolute threshold and/or a threshold relative to all other voice authentication measure(s).

If the decision at block 260 is yes (i.e., one of the registered users can be authenticated), then the system proceeds to block 262 and uses the occurrence of authentication to influence biasing parameter(s). For example, where the biasing parameter for a registered user is based on a quantity of past non-modified authentications for that user as compared to an additional quantity of past non-modified authentications (e.g., an overall quantity or quantity for verifications not for the registered user), the authentication can be used to adapt the biasing parameters for all registered users (i.e., by increasing either the "quantity" or the "additional quantity" in the comparison). As another example, where the biasing parameters for registered users is determined using a machine learning model, the occurrence of authentication can be used to generate a training instance for further training the machine learning model. Although block 262 is illustrated as occurring after block 260 and before block 264, it is noted that block 262 can optionally occur later in time than block 264 and can optionally be performed only when a batch of multiple recent authentications are available. However, it is noted that block 262 can, in various implementations, be performed only responsive to a yes determination at block 260.

At block 264, the system can use the authentication of one of the registered users in responding to the utterance of block 252. For example, the system can use the authentication in biasing ASR and/or NLU, in performing fulfillment, and/or in adapting TTS as described herein.

If the decision at block 260 is no (i.e., none of the registered users can be authenticated), then the system proceeds to block 266 and determines if biasing parameter(s) are available (e.g., based on enough past occurrences of block 262). If not, the system proceeds to block 270 (described below). If so, the system proceeds to block 268 and determines whether one of the registered users can be authenticated using the biasing parameter(s). For example, the system can utilize the biasing parameter for each of one or more registered users to generate a corresponding modified voice authentication measure for the registered user. The modified voice authentication measure for a registered user is a modification of an initially generated voice authentication measure for the registered user, where the modification is based on the biasing parameter for the registered user. The system can then determine whether to authenticate for any of the users based on the modified voice authentication measure(s). As another example, the system can utilize the biasing parameters as a tiebreaker between two or more initially generated voice authentication measure(s).

If the decision at block 268 is yes (i.e., one of the registered users can be authenticated), the system proceeds to block 264. If the decision at block 268 is no, the system proceeds to block 270.

At block 270, the system determines whether one of the registered users can be authenticated utilizing alternate authentication technique(s) such as facial verification, fingerprint verification, or entry of a passcode. In some implementations, block 270 can include prompting for the user to provide another utterance for again attempting voice authentication, at which point the method can proceed back to block 252.

If the decision at block 270 is yes (i.e., one of the registered users can be authenticated), the system proceeds to block 264. If the decision at block 268 is no, the system proceeds to block 272. At block 272, the system does not use any authentication in responding to the utterance. For example, the system can refrain from biasing ASR and/or NLU based on any data specific to any of the registered users. As another example, the system can prevent fulfillment (or provide an alternate fulfillment) based on lack of authentication. As yet another example, the system can perform TTS to generate synthesized audio data with a default voice instead of a voice customized to one of the registered users.

Figure 3:
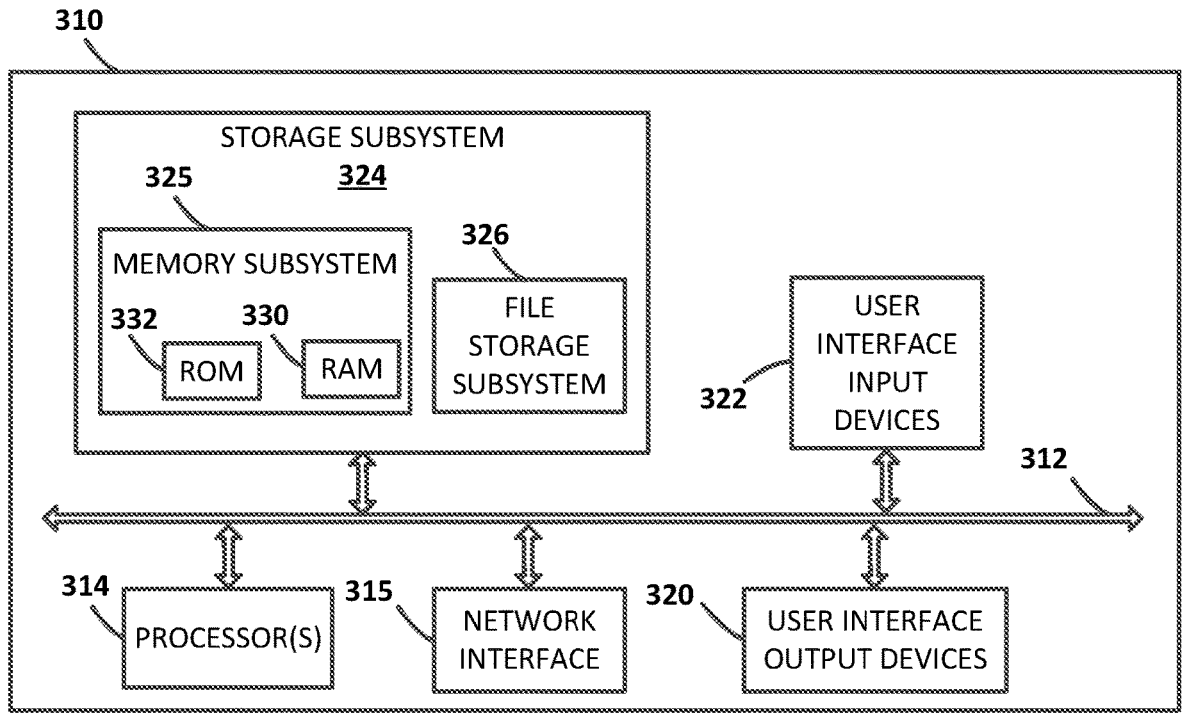
FIG. 3 illustrates an example architecture of a computing device.

FIG. 3 is a block diagram of an example computing device 310 that may optionally be utilized to perform one or more aspects of techniques described herein. In some implementations, one or more of an assistant device, and/or other component(s) may comprise one or more components of the example computing device 310.

Computing device 310 typically includes at least one processor 314 which communicates with a number of peripheral devices via bus subsystem 312. These peripheral devices may include a storage subsystem 324, including, for example, a memory subsystem 325 and a file storage subsystem 326, user interface output devices 320, user interface input devices 322, and a network interface subsystem 316. The input and output devices allow user interaction with computing device 310. Network interface subsystem 316 provides an interface to outside networks and is coupled to corresponding interface devices in other computing devices.

User interface input devices 322 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 310 or onto a communication network.

User interface output devices 320 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 310 to the user or to another machine or computing device.

Storage subsystem 324 stores programming and data constructs that provide the functionality of some or all of the modules described herein. For example, the storage subsystem 324 may include the logic to perform selected aspects of one or more of the methods described herein, and/or to implement various components depicted herein.

These software modules are generally executed by processor 314 alone or in combination with other processors. Memory 325 used in the storage subsystem 324 can include a number of memories including a main random access memory ("RAM") 330 for storage of instructions and data during program execution and a read only memory ("ROM") 332 in which fixed instructions are stored. A file storage subsystem 326 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 326 in the storage subsystem 324, or in other machines accessible by the processor(s) 314.

Bus subsystem 312 provides a mechanism for letting the various components and subsystems of computing device 310 communicate with each other as intended. Although bus subsystem 312 is shown schematically as a single bus, alternative implementations of the bus subsystem may use multiple busses.

Computing device 310 can be of varying types including a workstation, server, computing cluster, blade server, server farm, or any other data processing system or computing device. Due to the ever-changing nature of computers and networks, the description of computing device 310 depicted in FIG. 3 is intended only as a specific example for purposes of illustrating some implementations. Many other configurations of computing device 310 are possible having more or fewer components than the computing device depicted in FIG. 3.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by processor(s) is provided that includes receiving audio data that captures a spoken utterance and that is detected via one or more microphones of an assistant device. The method further includes generating a first user voice authentication measure for a first registered user of the assistant device. Generating the first user voice authentication measure includes: processing at least part of the audio data, using a speaker authentication model, to generate utterance features that correspond to the at least part of the audio data; and generating the first user voice authentication measure based on comparing the utterance features to first speaker features stored in association with the first registered user. The method further includes determining a first user biasing parameter that is specific to the assistant device and that is specific to the first registered user, and generating a modified first user voice authentication measure as a function of the first user voice authentication measure and the first user biasing parameter. The method further includes determining, based on the modified first user voice authentication measure, whether to authenticate the spoken utterance as being provided by the first registered user.

These and other implementations of the technology disclosed herein can include one or more of the following features.

In some implementations, the method further includes determining that the first user voice authentication measure fails to satisfy a threshold. In those implementations, generating the modified first user voice authentication measure can be performed in response to determining that the first user voice authentication measure fails to satisfy the threshold. In some versions of those implementations, the utterance features are an utterance embedding in embedding space and the first speaker features are a first speaker embedding, in the embedding space, generated based on prior enrollment utterances from the first user. In some of those versions, generating the first user voice authentication measure based on comparing the utterance features to first speaker features stored in association with the first registered user includes: generating a distance measure based on a distance, in the embedding space, between the utterance embedding and the first speaker embedding, and generating the first user voice authentication measure based on the distance measure.

In some implementations, the first user biasing parameter that is specific to the assistant device and that is specific to the first registered user is based on a quantity of past interactions, of the first user and with the assistant device, in which a corresponding non-modified authentication measure, for the the first registered user, satisfied a threshold.

In some versions of those implementations, the first user biasing parameter that is specific to the assistant device and that is specific to the first registered user is based on comparison of (a) the quantity of the past interactions of the first user and with the assistant device and (b) an additional quantity of other past interactions with the assistant device in which a corresponding non-modified authentication measure, for a corresponding user that is not the first registered user, satisfied the threshold. In some additional or alternative versions, the first user biasing parameter is further specific to one or more temporal conditions that correspond to one or more current temporal conditions and/or is further specific to one or more environmental conditions that correspond to one or more current environmental conditions.

In some implementations, determining the first user biasing parameter that is specific to the assistant device and that is specific to the first registered user includes processing one or more current contextual features using a machine learning model to generate output that reflects the first user biasing parameter and one or more additional biasing parameters for one or more additional registered users. In some versions of those implementations, the machine learning model is trained based on training instances that are each based on a corresponding past interaction with the assistant device. The training instances can each include training instance input that reflects corresponding contextual features at a time of one of the corresponding past interactions and ground truth output that reflects which, of the first registered user and the one or more additional registered users, was verified for the corresponding past interaction. In some of those versions, the one or more current contextual features comprise temporal conditions and/or environmental conditions.

In some implementations, the first user biasing parameter that is specific to the assistant device and that is specific to the first registered user is based on a calendar entry that indicates the first registered user is anticipated to currently be in a room to which the assistant device is assigned.

In some implementations, the method further includes generating a second user voice authentication measure, for a second registered user of the assistant device. Generating the second user voice authentication measure includes generating the second user voice authentication measure based on comparing the utterance features to second speaker features stored in association with the second registered user. In those implementations, the method further includes: determining a second user biasing parameter that is specific to the assistant device and that is specific to the second registered user; generating a modified second user voice authentication measure as a function of the second user voice authentication measure and the second user biasing parameter; and determining, based on the modified second user voice authentication measure, whether to authenticate the second utterance as being provided by the second registered user, in lieu of authenticating the second utterance as being provided by the first registered user. In some versions of those implementations, the method further includes determining that the first user voice authentication measure fails to satisfy a threshold and that the second user voice authentication measure also fails to satisfy the threshold. In some of those versions, generating the modified first user voice authentication measure and generating the modified second user voice authentication measure are performed in response to determining that the first user voice authentication measure and the second user voice authentication measures fail to satisfy the threshold.

In some implementations, generating the modified first user voice authentication measure as the function of the first user voice authentication measure and the first user biasing parameter includes using the first user biasing measure to boost or dampen the first user voice authentication measure.

In some implementations, generating the modified first user voice authentication measure as the function of the first user voice authentication measure and the first user biasing parameter includes: processing the first user biasing measure and the first user biasing parameter, using a trained machine learning model; and generating the modified first user voice authentication measure based on the processing.

In some implementations, the one or more processors are of the assistant device.

In some implementations, determining whether to authenticate the spoken utterance as being provided by the first user includes determining to authenticate the spoken utterance as being provided by the first user. In some of those implementations, the method further includes: processing the spoken utterance to determine that generating a response to the spoken utterance requires accessing access-restricted content; and accessing access-restricted content of the first user in generating the response, where the accessing is responsive to determining that generating the response requires accessing access-restricted content and is responsive to determining to authenticate the spoken utterance as being provided by the first user.

In some implementations, a method implemented by one or more processors is provided and includes receiving audio data that captures a spoken utterance and that is detected via one or more microphones of an assistant device. The method further includes generating a first user voice authentication measure, for a first registered user of the assistant device and generating a second user voice authentication measure, for a second registered user of the assistant device. Generating the first user voice authentication measure can include: processing at least part of the audio data, using a speaker authentication model, to generate utterance features that correspond to the at least part of the audio data; and generating the first user voice authentication measure based on comparing the utterance features to first speaker features stored in association with the first registered user. Generating the second user voice authentication measure can include generating the second user voice authentication measure based on comparing the utterance features to second speaker features stored in association with the second registered user. The method further includes: determining a first user biasing parameter that is specific to the assistant device and that is specific to the first registered user; determining a second user biasing parameter that is specific to the assistant device and that is specific to the second registered user; and determining whether to authenticate the spoken utterance as being provided by the first registered user or as being provided by the second registered user. Determining whether to authenticate the spoken utterance as being provided by the first registered user or as being provided by the second registered user is based on: the first user voice authentication measure, the second user voice authentication measure, the first user biasing parameter; and first second user biasing parameter.

Optionally, determining whether to authenticate the spoken utterance as being provided by the first registered user or as being provided by the second registered user includes: determining that the first user voice authentication measure and the second user voice authentication measure both satisfy a threshold; and in response to determining that the first user voice authentication measure and the second user voice authentication measure both satisfy the threshold: using the first user biasing parameter and the second user biasing parameter in selecting between the first registered user and the second registered user in determining whom to authenticate.

In some implementations, a method implemented by one or more processors is provided and includes receiving audio data that captures a spoken utterance and that is detected via one or more microphones of an assistant device. The method further includes generating a first user authentication measure, for a first registered user of the assistant device and determining the first user authentication measure satisfies a threshold. The method further includes, in response to the first user authentication measure satisfying the threshold: determining to authenticate the spoken utterance as being provided by the first registered user; and positively adapting a first user biasing parameter that is specific to the assistant device, that is specific to the first registered user. The method further includes, subsequent to positively adapting the first user biasing parameter, using the first user biasing parameter in determining whether to voice authenticate the first user.

In addition, some implementations may include a system including one or more user devices, each with one or more processors and memory operably coupled with the one or more processors, where the memory(ies) of the one or more user devices store instructions that, in response to execution of the instructions by the one or more processors of the one or more user devices, cause the one or more processors to perform any of the methods described herein. Some implementations also include at least one non-transitory computer-readable medium including instructions that, in response to execution of the instructions by one or more processors, cause the one or more processors to perform any of the methods described herein.

The invention claimed is:

1. A method implemented by one or more processors, the method comprising:
  receiving audio data that captures a spoken utterance, the audio data being detected via one or more microphones of an assistant device;
  generating a first user voice authentication measure, for a first registered user of the assistant device, wherein generating the first user voice authentication measure comprises:
    processing at least part of the audio data, using a speaker authentication model, to generate utterance features that correspond to the at least part of the audio data; and
    generating the first user voice authentication measure based on comparing the utterance features to first speaker features stored in association with the first registered user;
  determining that the first user voice authentication measure fails to satisfy a threshold;
  determining a first user biasing parameter that is specific to the assistant device and that is specific to the first registered user;
  generating a modified first user voice authentication measure as a function of the first user voice authentication measure and the first user biasing parameter,
    wherein generating the modified first user voice authentication measure is performed in response to determining that the first user voice authentication measure fails to satisfy the threshold; and
  determining, based on the modified first user voice authentication measure, whether to authenticate the spoken utterance as being provided by the first registered user.

2. The method of claim 1,
  wherein the utterance features are an utterance embedding in embedding space,
  wherein the first speaker features are a first speaker embedding, in the embedding space, generated based on prior enrollment utterances from the first user, and
  wherein generating the first user voice authentication measure based on comparing the utterance features to first speaker features stored in association with the first registered user comprises:
    generating a distance measure based on a distance, in the embedding space, between the utterance embedding and the first speaker embedding, and
    generating the first user voice authentication measure based on the distance measure.

3. The method of claim 1, wherein the first user biasing parameter that is specific to the assistant device and that is specific to the first registered user is based on a quantity of past interactions, of the first user and with the assistant device, in which a corresponding non-modified authentication measure, for the first registered user, satisfied a threshold.

4. The method of claim 3, wherein the first user biasing parameter that is specific to the assistant device and that is specific to the first registered user is based on comparison of (a) the quantity of the past interactions of the first user and with the assistant device and (b) an additional quantity of other past interactions with the assistant device in which a corresponding non-modified authentication measure, for a corresponding user that is not the first registered user, satisfied the threshold.

5. The method of claim 1, wherein determining the first user biasing parameter that is specific to the assistant device and that is specific to the first registered user comprises:
  processing one or more current contextual features using a machine learning model to generate output that reflects the first user biasing parameter and one or more additional biasing parameters for one or more additional registered users;
  wherein the machine learning model is trained based on training instances that are each based on a corresponding past interaction with the assistant device, the training instances each including training instance input that reflects corresponding contextual features at a time of one of the corresponding past interactions and ground truth output that reflects which, of the first registered user and the one or more additional registered users, was verified for the corresponding past interaction.

6. The method of claim 5, wherein the one or more current contextual features comprise one or both of temporal conditions and environmental conditions.

7. The method of claim 1, wherein the first user biasing parameter that is specific to the assistant device and that is specific to the first registered user is based on a calendar entry that indicates the first registered user is anticipated to currently be in a room to which the assistant device is assigned.

8. The method of claim 1, further comprising:
generating a second user voice authentication measure, for a second registered user of the assistant device, wherein generating the second user voice authentication measure comprises:
generating the second user voice authentication measure based on comparing the utterance features to second speaker features stored in association with the second registered user;
determining a second user biasing parameter that is specific to the assistant device and that is specific to the second registered user;
generating a modified second user voice authentication measure as a function of the second user voice authentication measure and the second user biasing parameter; and
determining, based on the modified second user voice authentication measure, whether to authenticate the second utterance as being provided by the second registered user, in lieu of authenticating the second utterance as being provided by the first registered user.

9. The method of claim 1, wherein generating the modified first user voice authentication measure as the function of the first user voice authentication measure and the first user biasing parameter comprises:
using the first user biasing measure to boost or dampen the first user voice authentication measure.

10. A method implemented by one or more processors, the method comprising:
receiving audio data that captures a spoken utterance, the audio data being detected via one or more microphones of an assistant device;
generating a first user voice authentication measure, for a first registered user of the assistant device, wherein generating the first user voice authentication measure comprises:
processing at least part of the audio data, using a speaker authentication model, to generate utterance features that correspond to the at least part of the audio data; and
generating the first user voice authentication measure based on comparing the utterance features to first speaker features stored in association with the first registered user;
determining a first user biasing parameter that is specific to the assistant device and that is specific to the first registered user, wherein determining the first user biasing parameter that is specific to the assistant device and that is specific to the first registered user comprises:
processing one or more current contextual features using a machine learning model to generate output that reflects the first user biasing parameter and one or more additional biasing parameters for one or more additional registered users;
wherein the machine learning model is trained based on training instances that are each based on a corresponding past interaction with the assistant device, the training instances each including training instance input that reflects corresponding contextual features at a time of one of the corresponding past interactions and ground truth output that reflects which, of the first registered user and the one or more additional registered users, was verified for the corresponding past interaction;
generating a modified first user voice authentication measure as a function of the first user voice authentication measure and the first user biasing parameter; and
determining, based on the modified first user voice authentication measure, whether to authenticate the spoken utterance as being provided by the first registered user.

11. The method of claim 10,
wherein the utterance features are an utterance embedding in embedding space,
wherein the first speaker features are a first speaker embedding, in the embedding space, generated based on prior enrollment utterances from the first user, and
wherein generating the first user voice authentication measure based on comparing the utterance features to first speaker features stored in association with the first registered user comprises:
generating a distance measure based on a distance, in the embedding space, between the utterance embedding and the first speaker embedding, and
generating the first user voice authentication measure based on the distance measure.

12. The method of claim 10, wherein the one or more current contextual features comprise one or both of temporal conditions and environmental conditions.

13. The method of claim 10, further comprising:
generating a second user voice authentication measure, for a second registered user of the assistant device, wherein generating the second user voice authentication measure comprises:
generating the second user voice authentication measure based on comparing the utterance features to second speaker features stored in association with the second registered user;
determining a second user biasing parameter that is specific to the assistant device and that is specific to the second registered user;
generating a modified second user voice authentication measure as a function of the second user voice authentication measure and the second user biasing parameter; and
determining, based on the modified second user voice authentication measure, whether to authenticate the second utterance as being provided by the second registered user, in lieu of authenticating the second utterance as being provided by the first registered user.

14. The method of claim 10, wherein generating the modified first user voice authentication measure as the function of the first user voice authentication measure and the first user biasing parameter comprises:
using the first user biasing measure to boost or dampen the first user voice authentication measure.

15. A method implemented by one or more processors, the method comprising:
receiving audio data that captures a spoken utterance, the audio data being detected via one or more microphones of an assistant device;
generating a first user voice authentication measure, for a first registered user of the assistant device, wherein generating the first user voice authentication measure comprises:

processing at least part of the audio data, using a speaker authentication model, to generate utterance features that correspond to the at least part of the audio data; and generating the first user voice authentication measure based on comparing the utterance features to first speaker features stored in association with the first registered user;

determining a first user biasing parameter that is specific to the assistant device and that is specific to the first registered user, wherein the first user biasing parameter that is specific to the assistant device and that is specific to the first registered user is based on a calendar entry that indicates the first registered user is anticipated to currently be in a room to which the assistant device is assigned;

generating a modified first user voice authentication measure as a function of the first user voice authentication measure and the first user biasing parameter; and determining, based on the modified first user voice authentication measure, whether to authenticate the spoken utterance as being provided by the first registered user.

16. The method of claim 15, further comprising:

generating a second user voice authentication measure, for a second registered user of the assistant device, wherein generating the second user voice authentication measure comprises:

generating the second user voice authentication measure based on comparing the utterance features to second speaker features stored in association with the second registered user;

determining a second user biasing parameter that is specific to the assistant device and that is specific to the second registered user;

generating a modified second user voice authentication measure as a function of the second user voice authentication measure and the second user biasing parameter; and determining, based on the modified second user voice authentication measure, whether to authenticate the second utterance as being provided by the second registered user, in lieu of authenticating the second utterance as being provided by the first registered user.

17. The method of claim 15, wherein generating the modified first user voice authentication measure as the function of the first user voice authentication measure and the first user biasing parameter comprises:

using the first user biasing measure to boost or dampen the first user voice authentication measure.

* * * * *